(12) United States Patent
Saito et al.

(10) Patent No.: US 11,512,221 B2
(45) Date of Patent: Nov. 29, 2022

(54) POWDER PAINT COMPOSITION

(71) Applicant: NIPPON PAINT INDUSTRIAL COATINGS CO., LTD., Tokyo (JP)

(72) Inventors: Hiroshi Saito, Osaka (JP); Hideaki Ogawa, Osaka (JP)

(73) Assignee: NIPPON PAINT INDUSTRIAL COATINGS CO., LTD., Tokyo (JP)

( * ) Notice: Subject to any disclaimer, the term of this patent is extended or adjusted under 35 U.S.C. 154(b) by 399 days.

(21) Appl. No.: 16/636,702

(22) PCT Filed: Jul. 30, 2018

(86) PCT No.: PCT/JP2018/028416
§ 371 (c)(1),
(2) Date: Feb. 5, 2020

(87) PCT Pub. No.: WO2019/031285
PCT Pub. Date: Feb. 14, 2019

(65) Prior Publication Data
US 2020/0165482 A1 May 28, 2020

(30) Foreign Application Priority Data
Aug. 10, 2017 (JP) .............................. JP2017-155848

(51) Int. Cl.
*C09D 163/00* (2006.01)
*C09D 7/63* (2018.01)
*C09D 5/03* (2006.01)
*H01B 3/40* (2006.01)

(52) U.S. Cl.
CPC ............. *C09D 163/00* (2013.01); *C09D 5/03* (2013.01); *C09D 7/63* (2018.01); *H01B 3/40* (2013.01)

(58) Field of Classification Search
None
See application file for complete search history.

(56) References Cited

FOREIGN PATENT DOCUMENTS

| CN | 103059692 | 4/2013 |
|----|-----------|--------|
| CN | 104745048 | 7/2015 |
| JP | 60-88079 | 5/1985 |
| JP | 60-88080 | 5/1985 |
| JP | 61-66762 | 4/1986 |
| JP | 9-279060 | 10/1997 |
| JP | 10-323616 | 12/1998 |
| JP | 11-172155 | 6/1999 |
| JP | 11-263926 | 9/1999 |
| JP | 11-323202 | 11/1999 |
| JP | 2006-273900 | 10/2006 |

OTHER PUBLICATIONS

International Search Report (ISR) dated Sep. 11, 2018 in International (PCT) Application No. PCT/JP2018/028416.
Office Action dated Mar. 8, 2021, in corresponding Chinese Patent Application No. 201880051700.X, with English translation.
"Coatings Technology", 2009, pp. 1518-1519, cited in CA.
International Preliminary Report on Patentability dated Feb. 20, 2020 in International (PCT) Patent Application No. PCT/JP2018/028416.

*Primary Examiner* — Ramsey Zacharia
(74) *Attorney, Agent, or Firm* — Wenderoth, Lind & Ponack, L.L.P.

(57) ABSTRACT

The present invention provides a powder coating composition capable of forming a uniform coating film being superior in edge cover property and superior in insulation property. In addition, by a method for forming a coating film in which the coating composition according to the present invention is used, heating can be performed at low temperature. The powder coating composition comprises a bisphenol A type epoxy resin (A), a phenolic curing agent (B), and a curing accelerator (C) as coating film forming components.

7 Claims, No Drawings

POWDER PAINT COMPOSITION

TECHNICAL FIELD

The present invention relates to a powder coating composition. In addition, the present invention relates to an electric transmission component and a method for forming a coating film.

BACKGROUND ART

Electrical insulating materials are widely used in the fields of electrical equipment, electronic equipment and the like. Generally, electrical insulating materials have a structure in which an insulating film for protecting and insulating a base material such as a conductor is formed on the base material. For example, an electrical insulating material is used in which an electrical insulating film has been formed by applying an electrical insulating coating composition comprising an organic resin such as a synthetic resin or a natural resin to a base material and then heating it.

As an example of such an electrical insulating coating composition, there is a powder coating composition for electrical insulation.

For example, Patent Literature 1 discloses an epoxy resin based powder coating comprising an epoxy resin, a curing agent, a curing accelerator, and a filler in which a component having a particle size of 20 μm or less accounts for 80% by weight or more as essential components (Claim 1, etc.). The invention described in Patent Literature 1 intends to provide an epoxy resin based powder coating for thin film that is superior in electrical insulation property and edge cover property, provides good melt fluidity and a superior leveling property, and at the same time does not change the appearance of a coating film with time during coating.

Patent Literature 2 discloses an epoxy resin based powder coating comprising (a) an epoxy resin having an epoxy equivalent of 550 to 1,200, (b) a polyphenol, (c) an inorganic filler, and (d) a curing accelerator.

CITATION LIST

Patent Literature

Patent Literature 1: JP-A-9-279060
Patent Literature 2: JP-A-11-172155

SUMMARY OF THE INVENTION

Technical Problems

However, along with the recent improvement in performance of electric components and electronic components, higher insulation performance has been demanded. Furthermore, along with the complication of the shapes of electric components and electronic components, it is difficult to form a coating film superior in smoothness from conventional coating compositions for electrical insulation. For example, the coating film thickness of the edge part is significantly smaller than that of a smooth part (hereinafter also expressed as "be inferior in edge cover property"), and insulation performance cannot be secured.

Thus, there is a demand for a coating composition being good in edge cover property for electric components and electronic components with a complicated shape, being capable of forming a coating film superior in smoothness, and being superior in insulation property.

In view of the above-mentioned present situation, the present invention intends to provide a coating composition being good in edge cover property for an object with a complicated shape, such as electric components and electronic components, being capable of forming a coating film uniform in thickness and capable of forming a coating film superior in smoothness, and further having a superior insulation property. In addition, the present invention provides a method for forming a coating film using the above-described coating composition.

Solution to Problems

In order to solve the above-described problems, the present invention provides the following embodiments.

[1] A powder coating composition comprising a bisphenol A type epoxy resin (A), a phenolic curing agent (B), and a curing accelerator (C) as coating film forming components, wherein the bisphenol A type epoxy resin (A) has an epoxy equivalent of 800 g/eq or more and 1,150 g/eq or less, and a softening point of 90° C. or higher and 115° C. or lower, the phenolic curing agent (B) has a phenolic hydroxyl equivalent of 200 g/eq or more and 750 g/eq or less, and the powder coating composition has a gel time at 200° C. of 10 seconds or more and 25 seconds or less.

[2] The powder coating composition according to [1], wherein the gel time at 200° C. is 15 seconds or more and 25 seconds or less.

[3] The powder coating composition according to [1] or [2], wherein a ratio of the epoxy equivalent (eq) of the bisphenol A type epoxy resin (A) to the phenolic hydroxyl equivalent (eq) of the phenolic curing agent (B) is 1:0.5 to 1:1.5.

[4] The powder coating composition according to any one of [1] to [3], wherein a cured coating film of the powder coating composition has a dielectric breakdown strength of 50 kV/mm or more and 200 kV/mm or less.

[5] The powder coating composition according to any one of [1] to [4], wherein the powder coating composition is a powder coating composition for electrical insulation.

[6] An electric transmission component having a cured film of the powder coating composition according to any one of [1] to [5] on an object to be coated.

[7] A method for forming a coating film, in which a cured film is formed by applying the powder coating composition according to any one of [1] to [6] to an object to be coated and heating it, wherein the heating is performed at a temperature of the object to be coated of 120° C. or higher and 250° C. or lower.

Effects of Invention

The powder coating composition of the present invention forms a coating film being superior in edge cover property, superior in smoothness, and superior in insulation property.

In addition, by a method for forming a coating film using a coating composition according to the present invention, heating can be performed at a temperature relatively low as a powder coating composition.

DESCRIPTION OF EMBODIMENTS

First, the process leading to the present invention will be described.

As described above, there is a demand for a coating composition being good in edge cover property for an object with a complicated shape, such as electric components and electronic components, being capable of forming a coating film uniform in thickness and capable of forming a coating film superior in insulation property.

However, when, for example, the cure speed of the coating composition is increased or the melt viscosity is increased in order to ensure the edge cover property, the uniformity, smoothness, etc. of a coating film are deteriorated and the insulation property of the coating film is sacrificed due to the presence of both a thick part and a thin part.

On the other hand, in order to improve the insulation property of a coating film, it is preferable to form a coating film being uniform in thickness. In order to form a coating film uniform in thickness from a powder coating composition, generally, the cure speed and the melt viscosity are adjusted.

However, even if the cure speed and the melt viscosity are simply adjusted, it tends to be impossible to secure the edge cover property of an object to be coated, in particular, an electric component and an electronic component having a complicated shape.

Accordingly, the present inventors have invented a coating composition capable of forming a coating film that can secure the edge cover property, have good smoothness, and be superior in insulation property.

For example, the powder coating composition of the present disclosure is capable of forming a coating film with a good edge cover property and a good surface smoothness, and capable of forming a coating film superior also in insulation property even by a single coating. Furthermore, the powder coating composition of the present disclosure can form a thick film (e.g., 400 µm or more) by a single coating.

For these reasons, the powder coating composition of the present disclosure can exhibit a remarkable effect also for electronic components and electrical components having an insulation property.

Although it should not be construed as being limited to a particular theory, for example, by using the coating composition according to the present invention, it is possible to increase the cure speed and ensure a good edge cover property. In addition, it is possible to solve one existing problem that smoothness is relatively deteriorated if the cure speed is increased. That is, the powder coating composition of the present disclosure can maintain a good smoothness of a coating film while increasing the cure speed.

In the present disclosure, being superior in edge cover property means, for example, being capable of forming a coating film with a thickness large enough for exerting, in an edge and its adjacent region of an object to be coated, a function comparable to that of other parts, provided that in at least a part of the object to be coated, no coating film is formed or, even if a coating film is formed, there is no region in which the film thickness is remarkably thin as compared to that of other parts.

If the edge cover property is good, a coating film that exhibits a function comparable to that of other parts can be formed even at an edge. Thereby it is possible to provide a superior insulation property even at an edge.

The powder coating composition according to the present invention having such effects is a powder coating composition comprising a bisphenol A type epoxy resin (A), a phenolic curing agent (B), and a curing accelerator (C) as coating film forming components, wherein the bisphenol A type epoxy resin (A) has an epoxy equivalent of 800 g/eq or more and 1,150 g/eq or less, and a softening point of 90° C. or higher and 115° C. or lower, the phenolic curing agent (B) has a phenolic hydroxyl equivalent of 200 g/eq or more and 750 g/eq or less, and the powder coating composition has a gel time at 200° C. of 10 seconds or more and 25 seconds or less.

In some embodiments, the powder coating composition for insulation according to the present invention may be an insulating powder coating composition. In some embodiments, the phenolic curing agent (B) may be a bisphenol A type phenolic curing agent having a phenolic hydroxyl equivalent of 200 g/eq or more and 750 g/eq or less. Further, in some embodiments, the curing accelerator (C) is may be at least one species selected from the group consisting of imidazole compounds, imidazoline compounds, and metal salt composites thereof, tertiary phosphine compounds, quaternary phosphonium salt compounds, and quaternary ammonium salt compounds, bisphenol A type epoxy resin imidazole adducts, and bisphenol A type epoxy resin amine adducts.

First, the powder coating composition in the present disclosure will be described.

The powder coating composition in the present disclosure has a gel time at 200° C. of 10 seconds or more and 25 seconds or less. In some embodiments, the gel time at 200° C. of the powder coating composition is 13 seconds or more and 25 seconds or less. In some embodiments, the gel time is 15 seconds or more and 25 seconds or less, for example, the gel time is 15 seconds or more and 24 seconds or less. In one embodiment, the gel time may be 15 seconds or more and 22 seconds or less, and in another embodiment, it is 15 seconds or more and 20 seconds or less.

Because the gel time at 200° C. is within the above range in the powder coating composition of the present invention, it is possible to form a coating film having a good edge cover property for an object to be coated, for example, electric components and electronic components with a complicated shape, having a superior coating film appearance, for example, a superior smoothness, and having a superior insulation property.

In particular, a powder coating composition having a gel time within the above range tends to have a faster cure speed after coating than a conventional coating composition.

As described above, conventionally, when the cure speed is adjusted in order to ensure the edge cover property, the coating film appearance, for example, the smoothness tends to be deteriorated. On the other hand, in order to improve the smoothness of a coating film, it is generally necessary to increase the flowability during heat curing. As a result, the edge cover property is inferior.

On the other hand, the powder coating composition of the present invention can form a coating film capable of well possessing both an edge cover property and smoothness and also can form a coating film superior in insulation property.

In one embodiment, the powder coating composition in the present disclosure has a minimum melt viscosity of 500 Pa·s or more and 2,000 Pa·s or less, and in another embodiment, the minimum melt viscosity under the above measurement conditions is 800 Pa·s or more and 1,500 Pa·s or more, for example, the minimum melt viscosity under the above measurement conditions is 1,000 Pa·s or more and 1,200 Pa·s or less. In the present description, the minimum melt viscosity is a minimum viscosity achieved when the temperature is raised from 80° C. to 160° C. at a rate of temperature increase of 5° C./minute, and it can be measured by, for example, a dynamic viscoelasticity analyzer (Rheosol-G3000; manufactured by UBM) or the like.

By the possession of the above-mentioned specific melt viscosity at a specific temperature, the rate at which the coating composition melts can be controlled. For this reason, when the powder coating composition of the present invention is applied to, for example, a component having a complicated shape, in some embodiments, to an electric component and an electronic component having a complicated shape, by a fluid dipping method or an electrostatic powder coating method, a coating film uniform in thickness can be formed without causing uneven thickness, stringiness and the like.

Although it should not be construed as being limited to a specific theory, when the minimum melt viscosity is out of the above range, melting is accelerated and the coating composition is easily fused each other.

For example, when the minimum melt viscosity of a coating composition is lower than the above range at the time of performing fluid dip coating, the film thickness changes depending on the density of the powder coating composition located around an object to be coated, so that a part with a high density will be thick and, conversely, a part with a low density will be thin.

In such an object to be coated, the term "uneven thickness" refers to a state in which a coating film uneven in thickness is formed. When uneven thickness occurs, problems with target physical properties of a coating film, such as poor smoothness, a poor edge cover property, and a poor insulation property of a coating film, may occur.

Herein, the minimum melt viscosity is a viscosity obtained by the following measurement. An object to be coated is heated at a rate of 5° C. per minute until it reaches a target temperature, and then the melt viscosity of a coating film is measured over time under the condition of maintaining the target temperature. At this time, the minimum viscosity is determined, and this is defined as the minimum melt viscosity. A complex viscosity determined by dynamic viscoelasticity measurement can be used for the measurement of the minimum melt viscosity.

Generally, when an object with a powder coating composition attached thereon is heated, the attached powder coating composition is melted with increase in temperature and the viscosity thereof is lowered therewith. Since a curing reaction advances with progress of time, the viscosity increases gradually. As a result, a phenomenon in which the melt viscosity is minimized is observed.

The average particle diameter of the powder coating composition of the present invention is not particularly limited. For example, a desired range can be chosen according to the coating method, etc.

In some embodiments, the average particle diameter of the powder coating composition is, for example, 25 μm or more and 50 μm or less when electrostatic coating is performed, and in some embodiments, it is 25 μm or more and 40 μm or less, for example, 30 μm or more and 35 μm or less. When electrostatic coating is performed, by having the average particle diameter, a coating film to be formed can be superior in smoothness and also superior in insulation property.

In another embodiment, for example, in the case of performing fluid dip coating, the average particle diameter of the powder coating composition is, for example, 50 μm or more and 200 μm or less, and in one embodiment, 80 μm or more and 170 μm or less, for example, 100 μm or more and 150 μm or less. When fluid dip coating is performed, by having the above average particle diameter, a stable fluidity in a fluid dip bath is obtained, whereby a coating film having a more uniform thickness can be formed.

As described above, the powder coating composition of the present invention can choose an average particle diameter according to its coating method. In any embodiment, because the powder coating composition has an average particle diameter within the above range, it can form a coating film being superior in edge cover property and uniform in thickness, can form a coating film being superior in smoothness, and can form a coating film being superior in insulation property.

In addition, it has a superior edge cover property, for example, a superior cover property even for an edge having a complicated shape. In addition, the surface appearance can be improved.

In the present description, the average particle diameter means a volume-average particle diameter (D50) unless otherwise specified. The volume-average particle diameter (D50) can be measured using a particle size analyzer such as a laser diffraction/scattering particle size distribution analyzer (manufactured by Nikkiso Co., Ltd., Microtrac) or the like. Specifically, it refers to a value measured using a "Microtrac MT3000II" (manufactured by Nikkiso Co., Ltd.) as a measuring device.

In the present disclosure, the average particle diameter of a powder coating composition is the average particle diameter of a powder coating composition comprising a bisphenol A type epoxy resin (A), a phenolic curing agent (B), and a curing accelerator (C).

The electrical insulation property of a cured coating film of a powder coating composition can be evaluated, for example, by measuring the dielectric breakdown strength of the cured coating film. In one embodiment, the dielectric breakdown strength of a cured coating film of the powder coating composition according to the present disclosure is 50 kV/mm or more and 200 kV/mm or less, and in another embodiment, the dielectric breakdown strength of a cured coating film of the powder coating composition is 80 kV/mm or more and 200 kV/mm or less, for example, the dielectric breakdown strength of a cured coating film of the powder coating composition is 100 kV/mm or more and 200 kV/mm or less.

With respect to the powder coating composition according to the present disclosure, the dielectric breakdown strength of its cured coating film may be a dielectric breakdown strength (electrical insulating property) within an appropriate range according to the required electrical insulation property as long as it is 50 kV/mm or more and 200 kV/mm or less. For example, it may be 60 kV/mm or more and 150 kV/mm or less, and in some embodiments, it is 60 kV/mm or more and 120 kV/mm or less.

The dielectric breakdown strength can be measured according to JIS C 2161.

Because a cured coating film of the powder coating composition according to the present invention has a dielectric breakdown strength within the above range, it can exhibit a superior electrical insulation property.

Furthermore, as described above, the powder coating composition of the present invention forms a coating film uniform in thickness on, for example, objects having a complicated shape, for example, an electric component and an electronic component having a complicated shape, and has a good edge cover property. Thereby, a superior electrical insulation property can be exhibited even for an object having a complicated shape, for example, an electrical component and an electronic component having a complicated shape.

In addition, the powder coating composition according to the present invention can impart a superior coating film appearance and a superior electrical insulation property not only to objects having a relatively simple shape but also to an electrical component and an electronic component (objects to be coated) having a complicated shape because its coating film can have a superior appearance, for example, superior smoothness.

The powder coating composition according to the present invention can also be applied to electrical components to be used in electric vehicles and the like. The powder coating composition of the present invention not only is high in heat resistance and flame retardancy, but also exhibits a superior electrical insulation property, for example, even in the case of being used outdoors, such as in automotive applications.

The electrical insulation property of a cured coating film of the powder coating composition of the present invention can exhibit a superior insulation property even when the thickness of the film is 50 μm or less, for example, about 25 μm. For example, when the film thickness is 50 μm, the dielectric breakdown voltage is 4.0 kV or more. In one embodiment, the dielectric breakdown voltage is 4.0 kV or more and 5.0 kV or less when the film thickness is 50 μm.

In another embodiment, the dielectric breakdown voltage is 1.5 kV or more when the film thickness is 30 μm.

On the other hand, in the case of known coating compositions, the dielectric breakdown voltage is usually 0.5 kV or less, for example, almost 0 kV in many cases even when the film thickness is 50 μm.

Thus, the powder coating composition according to the present invention can exhibit an insulation property even if it is in the form of an ultra-thin film (for example, having a thickness of 50 μm or less).

The dielectric breakdown voltage can be measured according to JIS C 2161.

The powder coating composition of the present invention can exhibit a superior electrical insulation property at various film thicknesses, for example, from a thin film about 25 μm thick to a thick film about 1,000 μm thick. Therefore, the powder coating composition of the present invention is also useful as a powder coating composition for insulation.

Next, each component in the powder coating composition according to the present disclosure will be described.

[Bisphenol A Type Epoxy Resin (A)]

The bisphenol A type epoxy resin (A) has an epoxy equivalent of 800 g/eq or more and 1,150 g/eq or less.

In one embodiment, the bisphenol A type epoxy resin (A) has an epoxy equivalent of 840 g/eq or more and 1,100 g/eq or less, for example, has an epoxy equivalent of 850 g/eq or more and 1,050 g/eq or less.

Because the epoxy equivalent of the bisphenol A type epoxy resin (A) is within the above range, the coating composition can form a coating film uniform in thickness, excellent in smoothness, and can form a coating film being superior in smoothness, and having a superior edge cover property, for example, having a superior cover property even for an edge having a complicated shape. Furthermore, a coating film having a superior insulation property can be formed.

The bisphenol A type epoxy resin (A) has a softening point of 90° C. or higher and 115° C. or lower. In one embodiment, the bisphenol A type epoxy resin (A) has a softening point of 90° C. or higher and 110° C. or lower, for example, a softening point of 92° C. or higher and 108° C. or lower.

Because the softening point of the bisphenol A type epoxy resin (A) is within the above range, it has a superior edge cover property, for example, a superior cover property even for an edge having a complicated shape. Furthermore, a coating film uniform in thickness can be formed, and a coating film superior in smoothness and also superior in insulation property can be formed. The softening point can be measured by a method known in the art.

In the present invention, because both the epoxy equivalent and the softening point of the bisphenol A type epoxy resin (A) are within the above ranges, a coating film further improved in edge cover property, smoothness and insulation property can be formed.

The amount of the bisphenol A type epoxy resin (A) according to the present disclosure is, per 100 parts by mass of the resin solid content of the powder coating composition, 55 parts by mass or more and 85 parts by mass or less, and in one embodiment, it is 55 parts by mass or more and 80 parts by mass or less, for example, 60 parts by mass or more and 80 parts by mass or less.

In the present disclosure, 100 parts by mass of the resin solid content of the powder coating composition means that the total resin solid content of the bisphenol A type epoxy resin (A), the phenolic curing agent (B), and the curing accelerator (C) is 100 parts by mass. In the following description, the same applies to the case where the resin solid content is disclosed to be 100 parts by mass unless otherwise specified.

By containing the bisphenol A type epoxy resin (A) within such a range, it is possible to impart superior mechanical strength, insulation property, flexibility, heat resistance, corrosion resistance, chemical resistance, etc. to a coating film formed from the powder coating composition. Therefore, by inclusion of the bisphenol A type epoxy resin (A) in the powder coating composition according to the present disclosure, it is possible to form a uniform dielectric coating film on electric components and electronic components having complicated shapes, and it is also possible to form a coating film having a good edge cover property and a better insulation property.

The powder coating composition in the present disclosure contains a bisphenol A type epoxy resin (A).

As the bisphenol A type epoxy resin, any suitable bisphenol A type epoxy resin can be used as long as it does not go beyond the scope of the present invention.

Preferably, a resin that is solid at normal temperatures (for example, 5° C. or higher and 35° C. or lower) is used. When a resin that is not solid at room temperature is used, there may be a problem that fusion between powder particles is likely to occur during the storage of the powder coating composition, and there may be cases where the powder coating does not become solid at room temperature and does not keep its powdery form.

As the bisphenol A type epoxy resin, those having 1.5 or more epoxy groups in one molecule are preferable.

The bisphenol A type epoxy resin can be prepared by, for example, a two-stage method in which bisphenol A [2,2-bis(4-hydroxyphenyl)propane] is reacted with epihalohydrin such as epichlorohydrin to yield a low molecular weight epoxy resin and then bisphenol A is further addition polymerized to adjust the epoxy resin to a desired molecular weight.

In one embodiment, the bisphenol A type epoxy resin may be a diglycidyl ether obtained through a reaction between bisphenol A and epichlorohydrin.

Commercially available products may be used as the bisphenol A type epoxy resin. Examples of such commercially available products include Epototo YD-014 (manufactured by Nippon Steel & Sumikin Chemical Co., Ltd.; epoxy equivalent: 950 g/eq, softening point: 97° C.), Epototo YD-904 (manufactured by Nippon Steel & Sumikin Chemical Co., Ltd.; epoxy equivalent: 950 g/eq, softening point: 105° C.), jER1004F (manufactured by Mitsubishi Chemical Corporation; epoxy equivalent: 925 g/eq, softening point: 103° C.), jER1005F (manufactured by Mitsubishi Chemical Corporation; epoxy equivalent: 1,000 g/eq, softening point: 107° C.), Araldide GT7004 (manufactured by Ciba-Geigy Japan; epoxy equivalent: 830 g/eq, softening point: 100° C.), EPICLON4050 (manufactured by DIC Corporation; epoxy equivalent: 950 g/eq, softening point: 100° C.), and the like. These may be used singly or two or more of them may be used in combination. In the powder coating composition of the present invention, superior effects on various physical properties such as flexibility can be exerted in addition to the above-mentioned remarkable effects even if one species of bisphenol A type epoxy resin (A) is used.

[Phenolic Curing Agent (B)]

The phenolic curing agent (B) has a phenolic hydroxyl equivalent of 200 g/eq or more and 750 g/eq or less, and in one embodiment, the phenolic hydroxyl equivalent is 250 g/eq or more and 600 g/eq or less, and for example, the phenolic hydroxyl equivalent is 300 g/eq or more and 500 g/eq or less.

Because the phenolic hydroxyl equivalent of the phenolic curing agent (B) is within the above range, the softening point of the powder coating composition can be adjusted to within a range where no fusion occurs between powder particles during the storage of the powder coating composition. Furthermore, the storage stability of the powder coating composition can be improved. In addition, it can have an appropriate reactivity and can suppress deterioration in chemical resistance, etc.

The amount of the phenolic curing agent (B) according to the present disclosure can be appropriately chosen in relation to the epoxy equivalent (eq) of the bisphenol A type epoxy resin (A). In one embodiment, the ratio of the epoxy equivalent (eq) of the bisphenol A type epoxy resin (A) to the phenolic hydroxyl equivalent (eq) of the phenolic curing agent (B) is 1:0.5 to 1:1.5, for example, 1:0.6 to 1:1.4, in one embodiment 1:0.6 to 1:1.2, and in another embodiment 1:0.8 to 1:1.1. Because the bisphenol A type epoxy resin (A) and the phenolic curing agent (B) have the above relationship, the molecular weight of the bisphenol A type epoxy resin (A) can be increased well through the curing reaction thereof, and superior physical properties, for example, superior coating film hardness can be imparted to a coating film formed, and moreover, good flexibility and/or good corrosion resistance can be imparted.

In one embodiment, the amount of the phenolic curing agent (B) is, per 100 parts by mass of the bisphenol A type epoxy resin (A), 15 parts by mass or more and 75 parts by mass or less, and in one embodiment, it is 20 parts by mass or more and 55 parts by mass or less and, for example, it is 25 parts by mass or more and 50 parts by mass or less.

By the inclusion of the phenolic curing agent (B) within the above range, a coating film formed from the powder coating composition can be imparted with superior mechanical strength, insulation property, flexibility, heat resistance, etc. For example, by the combination of the bisphenol A type epoxy resin (A) with the phenolic curing agent (B) according to the present invention, it is possible to form a uniform dielectric coating film on an electric component and an electronic component having a complicated shape and, moreover, a coating film being good in edge cover property and more improved in insulation property can be obtained.

The phenolic curing agent (B) to be used in the composition of the present invention can be appropriately chosen without departing from the scope of the present invention.

In some embodiments, a phenolic curing agent obtained by adding bisphenol A to a bisphenol A type epoxy resin (hereinafter also referred to as bisphenol A type phenolic curing agent) is chosen.

The above phenolic curing agent is superior in physical performance at low temperatures as compared with known curing agents other than the phenolic curing agents, and can be used even in a cold district, etc.

Examples of the bisphenol A type phenolic curing agent include compounds represented by the following formula (1). By using the above bisphenol A type phenolic curing agent, a coating film having a more improved flexibility can be formed.

[Chemical Formula 1]

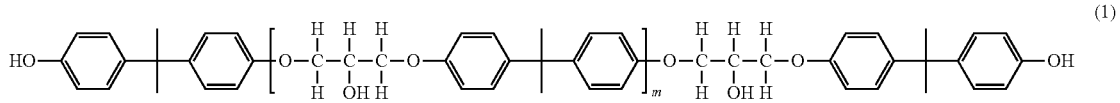

wherein m represents an integer of 1 to 4.

If m is less than 1 in the above formula (1), the compound cannot be synthesized using bisphenol A as a raw material. If m exceeds 4, the reaction is accelerated more than necessary during its synthesis, and a desired curing agent may not be obtained.

The compound represented by the formula (1) can be obtained, for example, through a reaction between a bisphenol A type epoxy resin and bisphenol A. Commercially available products may also be used. Examples of such commercially available products include jER Cure 170 (manufactured by Mitsubishi Chemical Corporation; phenolic hydroxyl equivalent: 340 g/eq, softening point: 90° C.), jER Cure 171N (manufactured by Mitsubishi Chemical Corporation; phenolic curing agent, phenolic hydroxyl equivalent: 225 g/eq, softening point: 80° C.), Epototo ZX-798P (manufactured by Nippon Steel & Sumikin Chemical Co., Ltd.; phenolic curing agent, phenolic hydroxyl equivalent: 710 g/eq, softening point: 115° C.), and the like.

[Curing Accelerator (C)]

The powder coating composition in the present disclosure contains a curing accelerator (C).

In the powder coating composition according to the present disclosure, the inclusion of the curing accelerator (C) in the combination of the epoxy resin (A) and the phenolic curing agent (B) according to the present invention can make the gel time of the powder coating composition at 200° C. to be 10 seconds or more and 25 seconds or less.

The amount of the curing accelerator (C) according to the present disclosure is, per 100 parts by mass of the bisphenol A type epoxy resin (A), 0.2 parts by mass or more and 4.8 parts by mass or less, and in some embodiments, it is 0.3 parts by mass or more and 4.5 parts by mass or less.

By the inclusion of the curing accelerator (C) within the above range, the cure time can be prevented to be excessively long, blocking in a normal temperature range can be suppressed, and superior storage stability can be exhibited.

As the curing accelerator (C), for example, at least one species selected from the group consisting of imidazole compounds, imidazoline compounds and their metal salt composites, tertiary phosphine compounds, quaternary phosphonium salt compounds; and quaternary ammonium salt compounds can be selected.

The imidazole compounds are not particularly limited, and examples thereof include alkylimidazoles such as 2-ethyl-4-methylimidazole, 1-methylimidazole, 1,2-dimethylimidazole, 2-methylimidazole, 2-ethylimidazole, 2-undecylimidazole, 2-heptadecylimidazole, and 2-isopropylimidazole, carbamylalkyl-substituted imidazoles such as 1-(2-carbamylethyl)imidazole, cyanoalkyl-substituted imidazoles such as 1-cyanoethyl-2-methylimidazole, aromatically substituted imidazoles such as 2-phenylimidazole, 2-phenyl-4-methylimidazole, and 1-benzyl-2-methylimidazole, alkenyl-substituted imidazoles such as 1-vinyl-2-methylimidazole, allyl-substituted imidazoles such as 1-allyl-2-ethyl-4-methylimidazole, and polyimidazoles, and preferably include alkylimidazoles and aromatically substituted imidazoles. Commercially available products may also be used. Examples of such commercially available products include 2MZ-H (manufactured by Shikoku Chemicals Corporation; 2-methylimidazole), C11Z (manufactured by Shikoku Chemicals Corporation; 2-undecylimidazole), C17Z (manufactured by Shikoku Chemicals Corporation; 2-heptadecylimidazole), 1.2DMZ (manufactured by Shikoku Chemicals Corporation; 1,2-dimethylimidazole), 2E4MZ (manufactured by Shikoku Chemicals Corporation; 2-ethyl-4-methylimidazole), 2P4MZ (manufactured by Shikoku Chemicals Corporation; 2-phenyl-4-methylimidazole), 1B2MZ (manufactured by commercially available product; 1-benzyl-2-methylimidazole), 1B2PZ (manufactured by Shikoku Chemicals Corporation; 1-benzyl-2-phenylimidazole), and the like.

The imidazoline compounds are not particularly limited, and examples thereof include 2-phenylimidazole, 2-methylimidazoline, 2-undecylimidazoline, 2-heptadecylimidazoline, and the like. Commercially available products may also be used. Examples of such commercially available products include 2PZ (manufactured by Shikoku Chemicals Corporation; 2-phenylimidazoline), and the like.

Examples of the metal salt composites include those obtained by combining the aforementioned imidazole compound or the aforementioned imidazoline compound with a metal salt. The metal salt is not particularly limited, and examples thereof include those composed of a metal such as copper, nickel, cobalt, calcium, zinc, zirconium, silver, chromium, manganese, tin, iron, titanium, antimony and aluminum, and a salt such as chloride, bromide, fluoride, sulfate, nitrate, acetate, malate, stearate, benzoate and methacrylate.

The tertiary phosphine compounds are not particularly limited, and examples thereof include triphenylphosphine, tritolylphosphine, and the like.

The quaternary phosphonium salt compounds are not particularly limited, and examples thereof include benzyltriphenylphosphonium chloride, butyltriphenylphosphonium bromide, ethyltriphenylphosphonium iodide, ethyltriphenylphosphonium bromide, and the like.

The quaternary ammonium salt compounds are not particularly limited, and examples thereof include tetraethylammonium chloride, tetraethylammonium bromide, benzyltrimethylammonium bromide, and the like.

In some embodiments, the curing accelerator (C) is at least one of an imidazole compound and an imidazole compound. By the inclusion of the above curing accelerator in the powder coating composition of the present invention, the gel time thereof can be adjusted to within the range of the present invention.

Furthermore, the edge cover property can be made good, and a coating film being superior in smoothness and also superior in insulation property can be formed.

In one embodiment, an amine adduct prepared by adding an amine compound to a bisphenol A type epoxy resin may be used as the curing accelerator (C). Examples of commercially available products thereof include EPICURE P101 (manufactured by Hexion; bisphenol A type epoxy resin-imidazole adduct), TH-1000 (manufactured by Nippon Steel & Sumikin Chemical Co., Ltd.; bisphenol A type epoxy resin amine adduct), jER Cure P200 (manufactured by Mitsubishi Chemical Corporation; bisphenol A type epoxy resin amine adducts), and the like. By using these, coating films particularly superior in flexibility can be formed.

The loading thereof is, per 100 parts by mass of the bisphenol A type epoxy resin (A), 1.5 parts by mass or more and 5.0 parts by mass or less, and in some embodiments, is 1.8 parts by mass or more and 4.5 parts by mass or less, for example, 2.0 parts by mass or more and 4.5 parts by mass or less.

[Other Components (D)]

Resin Component (D-1)

In one embodiment, the powder coating composition of the present invention may contain an epoxy resin other than the bisphenol A type epoxy resin (A) as long as the effects of the present invention are not impaired.

For example, it may be contained in order to an additional effect, such as further improvement in corrosion resistance, to a coating film formed from the powder coating composition of the present invention.

In one embodiment, it includes an epoxy resin having one or more epoxy groups per molecule on the average. Specifically, examples thereof include bisphenol type epoxy resins (B type, F type, etc.); novolac type phenol resins such as phenol novolac type epoxy resins and cresol novolac type epoxy resins; reaction products of phenol novolac or o-cresol novolac, bisphenol type epoxy resins (A Type, B type, F type, etc.) and epichlorohydrin; and reaction products of phenol novolac or o-cresol novolac and bisphenol type epoxy resins (A type, B type, F type, etc.). These epoxy resins may be used singly or two or more species thereof may be used in combination.

In one embodiment, in order to improve, for example, the corrosion resistance, the powder coating composition of the present invention may be used in combination with a phenol novolac resin and/or a cresol novolac resin, and the like without departing from the scope of the present invention.

In some embodiments, the powder coating composition of the present invention may contain an o-cresol novolac type epoxy resin. By the inclusion of the o-cresol novolac type epoxy resin, the corrosion resistance can be further improved.

As the o-cresol novolac type epoxy resin, any appropriate resin can be used. Preferably, a resin that is solid at room temperature is used. When a resin that is not solid at room temperature is used, there may be a problem that fusion between powder particles is likely to occur during the storage of the powder coating composition, and there may be cases where the powder coating does not become solid at room temperature and does not keep its powdery form. The softening point of the o-cresol novolac type epoxy resin is preferably 60° C. or higher, and in one embodiment, 60° C. or higher and 128° C. or lower.

As the o-cresol novolac type epoxy resin, those having 1.5 or more epoxy groups per molecule are preferable.

The o-cresol novolac type epoxy resin can be obtained, for example, by reacting o-cresol novolac, which is a reaction product of o-cresol and formaldehyde, with an epihalohydrin such as epichlorohydrin.

Commercially available products may be used as the o-cresol novolac type epoxy resin. Examples of such commercially available products include Epototo YDCN-701 (manufactured by Nippon Steel & Sumikin Chemical Co., Ltd.; epoxy equivalent: 205 g/eq, softening point: 65° C.), Epototo YDCN-702 (manufactured by Nippon Steel & Sumikin Chemical Co., Ltd.; epoxy equivalent: 205 g/eq, softening point: 70-80° C.), Epototo YDCN-703 (manufactured by Nippon Steel & Sumikin Chemical Co., Ltd.; epoxy equivalent: 205 g/eq, softening point: 80° C.), Epototo YDCN-704 (manufactured by Nippon Steel & Sumikin Chemical Co., Ltd.; epoxy equivalent: 205 g/eq, softening point: 90° C.), EPICOAT 180S65 (manufactured by Mitsubishi Chemical Corporation; epoxy equivalent: 210 g/eq, softening point: 67° C.), and the like. These may be used singly or two or more of them may be used in combination.

The amount of the resin component (D-1) is, per 100 parts by mass of the bisphenol A type epoxy resin (A), 1 part by mass or more and 50 parts by mass or less, and in one embodiment, is 1 part by mass or more and 30 parts by mass or less.

The powder coating composition of the present invention may contain known additives as desired.

Examples thereof include inorganic fillers, leveling agents, fluidization aids, degassing agents, and antipinholing agents. Each of these additives is preferably used in an amount of about 0.1 to about 5 parts by mass per 100 parts by mass of the resin solid content of the powder coating composition.

In some embodiments, the powder coating composition according to the present disclosure further comprises an inorganic filler. The inorganic filler contributes to the blocking of a corrosion factor, so that it improves the chemical resistance and can improve the flexibility of a coating film.

Examples of the inorganic filler include extender pigments such as alumina, silica, precipitated barium sulfate, calcium carbonate, clay, talc and mica; coloring inorganic pigments such as titanium dioxide, red iron oxide, yellow iron oxide and carbon black; and rustproofing pigments such as zinc phosphate and aluminum phosphate. Preferably, coloring inorganic pigments such as titanium dioxide, red iron oxide, yellow iron oxide, and carbon black are used. This is because a powder coating composition superior in hiding performance can be obtained.

The amount of the inorganic filler is, per 100 parts by mass of the resin solid content of the powder coating composition, 1 part by mass or more and 100 parts by mass or less, and in some embodiments, is 1 part by mass or more and 50 parts by mass or less, for example, 1 part by mass or more and 20 parts by mass or less.

In some embodiments, the powder coating composition according to the present disclosure may further comprise a colorant. As the colorant, any inorganic pigments and organic pigments that are used in powder coatings can usually be used.

Examples of chromatic inorganic pigments include red iron oxide, chrome titanium yellow, yellow iron oxide, and the like, and examples of achromatic inorganic pigments include titanium oxide, carbon black and the like. Examples of chromatic organic pigments include azo pigments, perylene pigments, condensed azo pigments, nitro pigments, nitroso pigments, phthalocyanine pigments, anthraquinone pigments, quinacridone pigments, dioxane pigments, and the like. Specifically, examples of the azo pigments include Lake Red, Fast Yellow, Disazo Yellow, Permanent Red, and the like. Examples of the nitro pigments include Naphthol Yellow and the like. Examples of the nitroso pigments include Pigment Green B, Naphthol Green, and the like. Examples of the phthalocyanine pigments include Phthalocyanine Blue, Phthalocyanine Green, and the like. Examples of the anthraquinone pigments include Indanthrene Blue, Dianthraquinonyl red, and the like. Examples of the quinacridone pigments include Quinacridone Red, Quinacridone Violet, and the like. Examples of the dioxane pigments include Carbazole Dioxazine Violet and the like.

While the content of the colorant in the powder coating varies depending on the type thereof, the content of an inorganic pigment is preferably 0.05 to 60 parts by mass per 100 parts by mass of the resin solid content of the powder coating composition and the content of an organic pigment is preferably 0.05 to 20 parts by mass per 100 parts by mass of the resin solid content of the powder coating composition.

(Powder Coating Composition for Insulation)

As described above, the powder coating composition of the present invention can exhibit a superior electrical insulation property at various film thicknesses, for example, in the form of both a thin film and a thick film. Thus, the powder coating composition of the present invention is useful also as a powder coating composition for insulation.

In some embodiments, an electric transmission component having, on an object to be coated, a cured film of the powder coating composition of the present invention, for example, a powder coating composition for insulation is provided.

Examples of the electric components include components such as insulating material components, insulating electronic material components, and insulating automobile components.

[Method for Producing Powder Coating Composition]

The powder coating composition in the present invention can be produced by a known method.

For example, the powder coating composition of the present invention is produced by preparing raw materials composed of the above-mentioned components, then preliminarily mixing the raw materials using a super mixer, a Henschel mixer, or the like, and then melt kneading the raw materials using a kneading device, such as a Co-Kneader, and an extruder.

The melt kneading is performed at a temperature at which at least a part of the raw materials is melted and the whole of the raw materials can be kneaded. The temperature at the time of the melt kneading is generally 80° C. or higher and 140° C. or lower, and in some embodiments, it is 80° C. or higher and 120° C. or lower.

The obtained melt is cooled and solidified with a cooling roll, a cooling conveyor, or the like, and pulverized to a desired particle diameter through coarse pulverization and fine pulverization steps. The pulverization can be performed by physical pulverization (coarse pulverization, fine pulverization), for example, using a pulverizer such as a hammer mill or a jet impact mill.

Then, classification is performed as desired. For example, it is possible to remove giant particles and fine particles and adjust particle size distribution. For the classification, an air classifier, a vibration sieve, an ultrasonic sieve, or the like is used.

The thus obtained powder coating composition of the present invention has a volume-average particle diameter of, for example, 5 to 60 μm.

In some embodiments, a powder coating composition for insulation can be prepared in the same manner as the method for preparing the powder coating composition. Similarly, a powder coating composition for insulation to be used for automobiles can be prepared.

[Method for Forming Coating Film]

A coating film can be formed by applying the powder coating composition of the present invention to an object to be coated, and then baking it by heating or the like.

(Object to Be Coated)

The object to be coated with the powder coating composition of the present invention is not particularly limited. The powder coating composition of the present invention can form a uniform coating film on object having a complicated shape, for example, electrical components and electronic components having a complicated shape, and the coating film is high in smoothness and, for example, the thickness of the film may 20 μm or more and 1,000 μm or less, and in one embodiment, it may be 40 μm or more and 900 μm or less.

As described above, the powder coating composition according to the present invention can form a uniform coating film even if the film is thick or thin, and it can form a coating film being high in smoothness and having a thickness of, for example, about 400 μm to about 500 μm, and can have a good edge cover property. Furthermore, it has a superior insulation property.

In one embodiment, the edge coverage is 8% or more and 42% or less, for example, 10% or more and 42% or less, and in a certain embodiment, 10% or more and 40% or less. In another aspect, the edge coverage is 14% or more and 38% or less.

In the present description, the higher the edge coverage is, the closer to the thickness of a coating film in a plane part the thickness of the coating film formed in an edge part is. Therefore, when the edge coverage is 0%, the background of an edge is almost exposed. That is, when the edge coverage gets higher, the edge cover property also gets higher.

The object to be coated is not particularly limited and it is, for example, an object that hardly undergoes melting, deformation and the like even when exposed to a temperature of 100° C. or higher and 400° C. or lower. Specific examples thereof include an iron plate, a steel plate, an aluminum plate and the like, and those obtained by surface-treating them, or members obtained by processing the aforementioned plates into a complicated shape, and the like.

For example, since the powder coating composition of the present invention can form a coating film being uniform in thickness even on end surfaces, burrs and corners of an object to be coated, it can improve the cover of edge parts, etc. by single coating, and can impart a superior insulation property to the object to be coated. In addition, since the coating composition according to the present invention has high heat resistance and flame retardancy, it can also be applied to electrical components to be used in electric vehicles and the like.

With respect to the coating film formation on an object to be coated, the powder coating composition of the present invention may be directly applied to an iron plate or the like, and for example, the powder coating composition of the present invention may be applied as an overcoat coating onto an undercoat coating film. As the undercoat coating for forming the undercoat coating film, known materials such as an electrodeposition coating and a primer can be used.

(Coating Method)

The present invention further provides a method for forming a coating film in which a cured film is formed by applying the powder coating composition to an object to be coated and heating it, wherein the heating is performed at a temperature of 120° C. or higher and 250° C. or lower.

The method of applying the powder coating composition is not particularly limited, and methods well known by those skilled in the art such as a spray coating method, an electrostatic powder coating method, and a fluid dipping method can be used. From the viewpoint of attaching efficiency, an electrostatic powder coating method is preferable.

In the following, one example of the electrostatic powder coating method is described.

For example, preheating of the object to be coated may be performed. For the preheating of the object to be coated, a heating furnace such as an electric furnace or a gas furnace is used, or induction heating using an induction heater is performed.

In this case, preheating should be performed in a range where the temperature of the object to be coated can be maintained at temperatures of 150° C. or higher and 300° C. or lower in consideration of the amount of heat storage depending on the shape and thickness of the object to be coated and the interval from preheating to the application. In general, the temperature is often set to about 10 to 30° C. higher than the application temperature of the powder coating composition.

The thickness of the coating film attained when applying the powder coating composition of the present invention is at least 20 μm or more and 1,000 μm or less from the viewpoints of preventing the mottled feeling and see-through of the coating film and preventing the generation of bubbles on the surface or inside of the coating film, and in order to exhibit a higher insulation property.

In some embodiments, it is 40 μm or more and 900 μm or less, for example, 100 μm or more and 800 μm or less, and particularly 150 μm or more and 700 μm or less.

Therefore, a uniform coating film can be formed from the powder coating composition of the present invention even if the coating film is thin or thick, and the coating film is high in smoothness.

For example, a thick film having a thickness of about 400 μm or more, and in some embodiments, a coating film having a thickness of about 500 μm or more and about 1,000 μm or less can be formed, and in addition, the coating film can be good in edge cover property, smoothness, and insulation property.

On the other hand, the powder coating composition according to the present invention can exhibit superior smoothness, edge cover property and insulation property even if the coating film is a thin film, for example, a thin film having a thickness of about 50 μm or more and about 150 μm.

For example, if the powder coating composition according to the present invention is used, the thickness of its film can be adjusted according to conditions such as required insulation property and smoothness, so that a coating film can be formed more efficiently than before and an excess powder coating composition can be reused. Through the same process, a coating film for insulation can be formed by applying a powder coating composition for insulation.

The heating temperature, for example, the baking temperature and the baking time vary depending on the type and amount of the curing agent to be used. The temperature is, for example, 120° C. or higher and 240° C. or lower from the viewpoint of preventing the generation of bubbles on the surface or in the inside of the coating film, and in some embodiments, it is 140° C. or higher and 240° C. or lower, for example, 160° C. or higher and 220° C. or lower. The baking time can be appropriately set according to the baking temperature.

In some embodiments, an electric component can be manufactured by forming a cured film by applying the powder coating composition according to the present invention to an object to be coated and then heating it.

Examples of the electric components include components such as insulating material components, insulating electronic material components, and insulating automobile components. If the powder coating composition of the invention is used, these components can have a coating film being superior in edge cover property and uniform and being superior in insulation property. Furthermore, even if the component is an electric component having a complicated shape, it can have such remarkable effects.

EXAMPLES

The present invention will be described more specifically with reference to the following examples, but the present invention is not limited to the examples. In the examples, "parts" and "%" are on a mass basis unless otherwise indicated.

Example 1

Preparation of Coating Composition
(Adjustment of Powder Coating Composition 1)
100 parts of jER1055 (manufactured by Mitsubishi Chemical Corporation; bisphenol A type epoxy resin, epoxy equivalent: 855 g/eq, softening point: 93° C.), 40.2 parts of jER Cure 170 (manufactured by Mitsubishi Chemical Corporation; phenolic curing agent, hydroxyl equivalent=340 g/eq, softening point: 90° C.), 0.4 parts of 2MZ-H (manufactured by Shikoku Chemicals Corporation; curing accelerator), 15 parts of TIPAQUE CR-50 (manufactured by Ishihara Sangyo Kaisha, Ltd.; titanium oxide), and 1 part of AEROSIL R972 (manufactured by Nippon Aerosil Co., Ltd., fine powder silica) were blended and mixed for 3 minutes using a super mixer (manufactured by Nihon Spindle Manufacturing Co., Ltd.).

Subsequently, melt kneading was carried out at 100° C. with a Co-Kneader (manufactured by Buss AG), and the resulting kneadate was extruded, cooled, then coarsely pulverized, and further pulverized using a KRYPTRON. The resulting pulverized product was classified using a Turbo Classifier (manufactured by Nisshin Engineering Inc.) to obtain a powder coating composition 1 having an average particle diameter of 35 μm.

(Formation of Coating Film 1)
A solvent-degreased hot-dip galvanized steel sheet (75 mm×150 mm×0.8 mm) was preheated to 200° C. Then, the powder coating composition 1 obtained as described above was applied by using an electrostatic applicator for a powder coating (applied voltage: −80 kV) such that dry film thicknesses of 50 μm and 100 μm were achieved, followed by baking at 180° C. for 20 minutes, and thus a coating film 1 was obtained.

Examples 2 to 18, Comparative Examples 1 to 16

Powder coating compositions were prepared in the same manner as in Example 1 except that the type and amount of each component were changed as shown in Tables 1A, 1B, 2A and 2B below. Details of the raw materials relating to the components (A) to (C) used are described below.

Using the powder coating compositions obtained, coating films were formed in the same manner as in Example 1.

In Example 18, the baking temperature and time were set to be 120° C. and 40 minutes. Also in Comparative Example 16, the baking temperature and time were set to be 120° C. and 40 minutes.

jER1004 (manufactured by Mitsubishi Chemical Corporation; bisphenol A type epoxy resin, epoxy equivalent: 925 g/eq, softening point: 97° C.)

Epototo YD-904 (manufactured by Nippon Steel & Sumikin Chemical Co., Ltd.; bisphenol A type epoxy resin, epoxy equivalent: 950 g/eq, softening point: 105° C.)

Epototo YD-012 (manufactured by Nippon Steel & Sumikin Chemical Co., Ltd.; bisphenol A type epoxy resin, epoxy equivalent: 655 g/eq, softening point: 81° C.)

Epototo YD-907 (manufactured by Nippon Steel & Sumikin Chemical Co., Ltd.; bisphenol A type epoxy resin, epoxy equivalent: 1,500 g/eq, softening point: 126° C.)

jER1007 (manufactured by Mitsubishi Chemical Corporation; bisphenol A type epoxy resin, epoxy equivalent: 1,975 g/eq, softening point: 128° C.)

jER Cure 171N (manufactured by Mitsubishi Chemical Corporation; phenolic curing agent, hydroxyl group equivalent: 225 g/eq, softening point: 80° C.)

Epototo ZX-798P (manufactured by Nippon Steel & Sumikin Chemical Co., Ltd.; phenolic curing agent, hydroxyl group equivalent: 710 g/eq, softening point: 115° C.)

Dicyandiamide (manufactured by Nippon Carbide Industries Co., Inc.; amine curing agent (dicyandiamide), amino group equivalent; 42 g/eq) epoxy equivalent: amino group equivalent=1:1 was compounded and used.

EPICURE P101 (manufactured by Hexion; curing accelerator, imidazole adduct of bisphenol A type epoxy resin)

TH-1000 (manufactured by Nippon Steel & Sumikin Chemical Co., Ltd.; curing accelerator, amine adduct of bisphenol A type epoxy resin)

The following evaluations were performed using the powder coating compositions and dielectric coating films obtained in Examples 1 to 18 and Comparative Examples 1 to 16. The obtained evaluation results are shown in Tables 1A, 1B, 2A and 2B below.

(Gel Time)
For the powder coating compositions obtained, a gel time was measured in accordance with JIS K 5600-9-1 (Determination of gel time of thermosetting coating powders at a given temperature) as follows.

About 0.1 g of a powder coating composition was placed on a hot plate with a surface temperature adjusted to 200° C. such that the composition became as flat as possible. Then, the powder coating composition was started to stir using a toothpick with the definition that the point of time when the powder coating is melted completely is taken as a standard (time=0 s), and the time taken until the point of time when the powder coating composition reaches the state in which it does not string even when the toothpick is lifted was measured. The same test was repeated 5 times, and the average value of the three values resulting from exclusion of the maximum value and the minimum value was defined as a gel time (s).

(Coating Film Appearance)

The appearance of the obtained dielectric coating films was visually observed and evaluated according to the following criteria.
- o: The whole film is uniform and smooth.
- Δ: Some orange peel is found.
- x: Conspicuous dent is found.

(Edge Cover Property)

A powder coating composition was applied to an object to be coated, namely, an aluminum steel sheet A1050 having an edge bent at an angle of 45°, with an electrostatic applicator for a powder coating such that a film thickness of 100 μm was attained at a flat part. Then, it was baked at 180° C. for 20 minutes to yield a specimen. The film thickness of the flat part of the specimen and the film thickness of the edge part thereof were measured. Then, the edge coverage defined below was calculated and the edge cover property was evaluated. The edge coverage (%) was calculated as follows.

Edge coverage (%)=(film thickness of edge part)/(film thickness of flat part)×100

The film thickness of the edge part is a film thickness taken from the top of the edge part in the perpendicular direction and the film thickness of the flat part is a film thickness of a flat part located 10 mm away from the top of the edge part, both measured by image observation using a digital microscope VHX-100 (manufactured by Keyence Corporation).

In the present description, the higher the edge coverage is, the closer to the thickness of a coating film in a plane part the thickness of the coating film formed in an edge part is. Therefore, when the edge coverage is 0%, the background of an edge is almost exposed.

(Breakdown Voltage and Electrical Insulation Property)

For the obtained specimens (coated sheets), the strength of dielectric breakdown was evaluated by a short time method using a digital withstand voltage and insulation tester 8504 (manufactured by Tsuruga Electric Corporation) in accordance with JIS C 2161 (Test methods of coating powders for electrical insulation 8.9).

A spectacle cell having a diameter of 20 mm was placed on the coating film surface side of an obtained specimen. Then, a glycerin solution was poured into the spectacle cell, and the specimen was allowed to stand. Subsequently, electrodes were attached to the glycerin solution in the spectacle cell and the back surface (metal surface) of the specimen, respectively, and a lead wire was connected to the electrodes to form a test circuit. A voltage was applied to the formed circuit, and the breakdown voltages (kV/50 μm and kV/100 μm) achieved when the coating film surface of the specimen was broken were measured. The voltage application was increased from 0 at a constant rate which was as high as dielectric breakdown of the sample occurred in 10 to 20 seconds on average. Then, a dielectric breakdown strength (kV/mm) was calculated by dividing the measured value of breakdown voltage by the thickness of the dielectric coating film. The same test was repeated 8 times at different measurement locations, and the average value of the measurements was evaluated as electrical insulation property.

(Flexibility)

For the specimens (coated plates) obtained in the Example and the Comparative Examples, their weight drop resistance was evaluated according to JIS K 5600-5-3 (a weight drop resistance test).

Using a DuPont impact tester (punch diameter: ½ inch; manufactured by Ueshima Seisakusho Co., Ltd.), a 1 kg weight was dropped from a certain height and the height at which cracking occurred was measured, and the flexibility (weight dropping resistance) was evaluated. "50<" in the table indicates a case in which no cracks were generated even when a weight was dropped from a height of 50 cm.

TABLE 1A

| | Component | Epoxy equivalent (g/eq) | Softening point (° C.) | Example 1 | Example 2 | Example 3 | Example 4 | Example 5 |
|---|---|---|---|---|---|---|---|---|
| (A) | Epototo YD-012 | 655 | 81 | | | | | |
| | jER1055 | 850 | 93 | 100 | | | | |
| | jER1004 | 925 | 97 | | 100 | | | |
| | Epototo YD-904 | 950 | 105 | | | 100 | 100 | 100 |
| | Epototo YD-907 | 1500 | 126 | | | | | |
| | jER1007 | 1975 | 128 | | | | | |
| | | Phenolic hydroxyl equivalent (g/eq) | Softening point (° C.) | | | | | |
| (B) | jER Cure 170 | 340 | 90 | 40.2 | 37 | 36 | 36 | 36 |
| | jER Cure 171N | 225 | 80 | | | | | |
| | Epototo ZX-798P | 710 | 115 | | | | | |
| | Dicyandiamide | 42 (amino group equivalent) | — | | | | | |
| (C) | 2MZ-H | | | 0.4 | 0.4 | 0.3 | 0.4 | 0.5 |
| | EPICURE P101 | | | | | | | |
| | TH-1000 | | | | | | | |
| Others | TIPAQUE CR-50 | | | 15 | 15 | 15 | 15 | 15 |
| | AEROSIL R972 | | | 1 | 1 | 1 | 1 | 1 |

TABLE 1A-continued

| | Example 1 | Example 2 | Example 3 | Example 4 | Example 5 |
|---|---|---|---|---|---|
| Epoxy equivalent:Phenolic hydroxyl equivalent | 1:1 | 1:1 | 1:1 | 1:1 | 1:1 |
| Gel time (s) | 25 | 22 | 24 | 19 | 14 |
| Appearance | ○ | ○ | ○ | ○ | ○ |
| Edge coverage (%) | 10 | 24 | 14 | 20 | 26 |
| Electrical insulation property (kV/mm) | 100 | 100 | 100 | 100 | 80 |
| Breakdown voltage (kV/100 μm) | 10 | 10 | 10 | 10 | 8 |
| Breakdown voltage (kV/50 μm) | 5 | 5 | 5 | 5 | 4 |
| Flexibility (cm) | 50 | 50 | 50 | 50 | 50 |
| Baking temperature/time | 180° C./20 minutes | 180° C./20 minutes | 180° C./20 minutes | 180° C./20 minutes | 180° C./20 minutes |

| | Component | Epoxy equivalent (g/eq) | Softening point (° C.) | Example 6 | Example 7 | Example 8 | Example 9 |
|---|---|---|---|---|---|---|---|
| (A) | Epototo YD-012 | 655 | 81 | | | | |
| | jER1055 | 850 | 93 | | | | |
| | jER1004 | 925 | 97 | | | | |
| | Epototo YD-904 | 950 | 105 | 100 | 100 | 100 | 100 |
| | Epototo YD-907 | 1500 | 126 | | | | |
| | jER1007 | 1975 | 128 | | | | |
| | | Phenolic hydroxyl equivalent (g/eq) | Softening point (° C.) | | | | |
| (B) | jER Cure 170 | 340 | 90 | 36 | 36 | 36 | 36 |
| | jER Cure 171N | 225 | 80 | | | | |
| | Epototo ZX-798P | 710 | 115 | | | | |
| | Dicyandiamide | 42 (amino group equivalent) | — | | | | |
| (C) | 2MZ-H | | | 3 | 3.5 | 4 | 4.5 |
| | EPICURE P101 | | | | | | |
| | TH-1000 | | | | | | |
| Others | TIPAQUE CR-50 | | | 15 | 15 | 15 | 15 |
| | AEROSIL R972 | | | 1 | 1 | 1 | 1 |
| Epoxy equivalent:Phenolic hydroxyl equivalent | | | | 1:1 | 1:1 | 1:1 | 1:1 |
| Gel time (s) | | | | 21 | 18 | 13 | 10 |
| Appearance | | | | ○ | ○ | ○ | ○ |
| Edge coverage (%) | | | | 29 | 35 | 38 | 42 |
| Electrical insulation property (kV/mm) | | | | 100 | 100 | 80 | 50 |
| Breakdown voltage (kV/100 μm) | | | | 10 | 10 | 8 | 5 |
| Breakdown voltage (kV/50 μm) | | | | 5 | 5 | 4 | 2 |
| Flexibility (cm) | | | | 50< | 50< | 50< | 50< |
| Baking temperature/time | | | | 180° C./20 minutes | 180° C./20 minutes | 180° C./20 minutes | 180° C./20 minutes |

TABLE 1B

| | Component | Epoxy equivalent (g/eq) | Softening point (° C.) | Example 10 | Example 11 | Example 12 | Example 13 | Example 14 |
|---|---|---|---|---|---|---|---|---|
| (A) | Epototo YD-012 | 655 | 81 | | | | | |
| | jER1055 | 850 | 93 | | | | | |
| | jER1004 | 925 | 97 | | | | | |
| | Epototo YD-904 | 950 | 105 | 100 | 100 | 100 | 100 | 100 |
| | Epototo YD-907 | 1500 | 126 | | | | | |
| | jER1007 | 1975 | 128 | | | | | |
| | | Phenolic hydroxyl equivalent (g/eq) | Softening point (° C.) | | | | | |
| (B) | jER Cure 170 | 340 | 90 | 29.6 | 43 | 21.5 | 50.1 | |
| | jER Cure 171N | 225 | 80 | | | | | 23.7 |
| | Epototo ZX-798P | 710 | 115 | | | | | |
| | Dicyandiamide | 42 (amino group equivalent) | — | | | | | |
| (C) | 2MZ-H | | | 0.4 | 0.4 | 0.4 | 0.4 | 0.4 |
| | EPICURE P101 | | | | | | | |
| | TH-1000 | | | | | | | |
| Others | TIPAQUE CR-50 | | | 15 | 15 | 15 | 15 | 15 |
| | AEROSIL R972 | | | 1 | 1 | 1 | 1 | 1 |
| Epoxy equivalent:Phenolic hydroxyl equivalent | | | | 1:0.8 | 1:1.2 | 1:0.6 | 1:1.4 | 1:1 |
| Gel time (s) | | | | 19 | 22 | 17 | 23 | 16 |
| Appearance | | | | ○ | ○ | ○ | ○ | ○ |
| Edge coverage (%) | | | | 29 | 20 | 24 | 29 | 15 |

TABLE 1B-continued

| | Example 11 | Example 12 | Example 13 | Example 14 | |
|---|---|---|---|---|---|
| Electrical insulation property (kV/mm) | 100 | 80 | 60 | 80 | 100 |
| Breakdown voltage (kV/100 μm) | 10 | 8 | 6 | 8 | 10 |
| Breakdown voltage (kV/50 μm) | 5 | 4 | 3 | 4 | 4 |
| Flexibility (cm) | 50 | 50 | 30 | 50 | 50 |
| Baking temperature/time | 180° C./20 minutes | 180° C./20 minutes | 180° C./20 minutes | 180° C./20 minutes | 180° C./20 minutes |

| | Component | | | Example 15 | Example 16 | Example 17 | Example 18 |
|---|---|---|---|---|---|---|---|
| | | Epoxy equivalent (g/eq) | Softening point (° C.) | | | | |
| (A) | Epototo YD-012 | 655 | 81 | | | | |
| | jER1055 | 850 | 93 | | | | |
| | jER1004 | 925 | 97 | | | | |
| | Epototo YD-904 | 950 | 105 | 100 | 100 | 100 | 100 |
| | Epototo YD-907 | 1500 | 126 | | | | |
| | jER1007 | 1975 | 128 | | | | |
| | | Phenolic hydroxyl equivalent (g/eq) | Softening point (° C.) | | | | |
| (B) | jER Cure 170 | 340 | 90 | | 36 | 36 | 36 |
| | jER Cure 171N | 225 | 80 | | | | |
| | Epototo ZX-798P | 710 | 115 | 74.7 | | | |
| | Dicyandiamide | 42 (amino group equivalent) | — | | | | |
| (C) | 2MZ-H | | | 0.4 | | | 0.4 |
| | EPICURE P101 | | | | | | |
| | TH-1000 | | | | 3 | 4 | |
| Others | TIPAQUE CR-50 | | | 15 | 15 | 15 | 15 |
| | AEROSIL R972 | | | 1 | 1 | 1 | 1 |
| Epoxy equivalent:Phenolic hydroxyl equivalent | | | | 1:1 | 1:1 | 1:1 | 1:1 |
| Gel time (s) | | | | 25 | 25 | 19 | 19 |
| Appearance | | | | ○ | ○ | ○ | ○ |
| Edge coverage (%) | | | | 40 | 8 | 25 | 16 |
| Electrical insulation property (kV/mm) | | | | 80 | 100 | 80 | 100 |
| Breakdown voltage (kV/100 μm) | | | | 8 | 10 | 8 | 10 |
| Breakdown voltage (kV/50 μm) | | | | 4 | 5 | 4 | 5 |
| Flexibility (cm) | | | | 50 | 50< | 50< | 50 |
| Baking temperature/time | | | | 180° C./20 minutes | 180° C./20 minutes | 180° C./20 minutes | 120° C./40 minutes |

TABLE 2A

| | Component | | | Comparative Example 1 | Comparative Example 2 | Comparative Example 3 | Comparative Example 4 |
|---|---|---|---|---|---|---|---|
| | | Epoxy equivalent (g/eq) | Softening point (° C.) | | | | |
| (A) | Epototo YD-012 | 655 | 81 | 100 | | | |
| | jER1055 | 850 | 93 | | | | |
| | jER 1004 | 925 | 97 | | | | |
| | Epototo YD-904 | 950 | 105 | | | | 100 |
| | Epototo YD-907 | 1500 | 126 | | 100 | | |
| | jER1007 | 1975 | 128 | | | 100 | |
| | | Phenolic hydroxyl equivalent (g/eq) | Softening point (° C.) | | | | |
| (B) | jER Cure 170 | 340 | 90 | 52.2 | 22.8 | 17.3 | 36 |
| | jER Cure 171N | 225 | 80 | | | | |
| | Epototo ZX-798P | 710 | 115 | | | | |
| | Dicyandiamide | 42 (amino group equivalent) | — | | | | |
| (C) | 2MZ-H | | | 0.4 | 0.4 | 0.4 | 0.1 |
| | EPICURE P101 | | | | | | |
| | TH-1000 | | | | | | |
| Others | TIPAQUE CR-50 | | | 15 | 15 | 15 | 15 |
| | AEROSIL R972 | | | 1 | 1 | 1 | 1 |
| Epoxy equivalent:Phenolic hydroxyl equivalent | | | | 1:1 | 1:1 | 1:1 | 1:1 |
| Gel time (s) | | | | 65 | 27 | 30 | 53 |
| Appearance | | | | ○ | Δ | x | ○ |
| Edge coverage (%) | | | | 0 | 20 | 25 | 0 |

TABLE 2A-continued

| | | | | |
|---|---|---|---|---|
| Electrical insulation property (kV/mm) | 100 | 10 | 5 | 100 |
| Breakdown voltage (kV/100 pm) | 10 | 1 | 0.5 | 10 |
| Breakdown voltage (kV/50 pm) | 5 | 0 | 0 | 5 |
| Flexibility (cm) | 50 | 50 | 50 | 50 |
| Baking temperature/time | 180° C./20 minutes | 180° C./20 minutes | 180° C./20 minutes | 180° C./20 minutes |

| | Component | Epoxy equivalent (g/eq) | Softening point (° C.) | Comparative Example 5 | Comparative Example 6 | Comparative Example 7 | Comparative Example 8 |
|---|---|---|---|---|---|---|---|
| (A) | Epototo YD-012 | 655 | 81 | | | | |
| | jER1055 | 850 | 93 | | | | |
| | jER 1004 | 925 | 97 | | | | |
| | Epototo YD-904 | 950 | 105 | 100 | 100 | 100 | 100 |
| | Epototo YD-907 | 1500 | 126 | | | | |
| | jER1007 | 1975 | 128 | | | | |
| | | Phenolic hydroxyl equivalent (g/eq) | Softening point (° C.) | | | | |
| (B) | jER Cure 170 | 340 | 90 | 36 | 36 | 36 | 36 |
| | jER Cure 171N | 225 | 80 | | | | |
| | Epototo ZX-798P | 710 | 115 | | | | |
| | Dicyandiamide | 42 (amino group equivalent) | — | | | | |
| (C) | 2MZ-H | | | 0.2 | 0.6 | | |
| | EPICURE P101 | | | | | 1 | 2 |
| | TH-1000 | | | | | | |
| Others | TIPAQUE CR-50 | | | 15 | 15 | 15 | 15 |
| | AEROSIL R972 | | | 1 | 1 | 1 | 1 |
| Epoxy equivalenbPhenolic hydroxyl equivalent | | | | 1:1 | 1:1 | 1:1 | 1:1 |
| Gel time (s) | | | | 32 | 9 | 60 | 37 |
| Appearance | | | | ○ | x | ○ | ○ |
| Edge coverage (%) | | | | 0 | 31 | 0 | 0 |
| Electrical insulation property (kV/mm) | | | | 100 | 30 | 100 | 100 |
| Breakdown voltage (kV/100 pm) | | | | 10 | 3 | 10 | 10 |
| Breakdown voltage (kV/50 pm) | | | | 5 | 0 | 5 | 5 |
| Flexibility (cm) | | | | 50 | 50 | 30 | 50< |
| Baking temperature/time | | | | 180° C./20 minutes | 180° C./20 minutes | 180° C./20 minutes | 180° C./20 minutes |

TABLE 2B

| | Component | Epoxy equivalent (g/eq) | Softening point (° C.) | Comparative Example 9 | Comparative Example 10 | Comparative Example 11 | Comparative Example 12 |
|---|---|---|---|---|---|---|---|
| (A) | Epototo YD-012 | 655 | 81 | | | | 100 |
| | jER1055 | 850 | 93 | | | | |
| | jER1004 | 925 | 97 | | | | |
| | Epototo YD-904 | 950 | 105 | 100 | 100 | 100 | |
| | Epototo YD-907 | 1500 | 126 | | | | |
| | jER1007 | 1975 | 128 | | | | |
| | | Phenolic hydroxyl equivalent (g/eq) | Softening point (° C.) | | | | |
| (B) | jER Cure 170 | 340 | 90 | 36 | 36 | | 52.2 |
| | jER Cure 171N | 225 | 80 | | | | |
| | Epototo ZX-798P | 710 | 115 | | | | |
| | Dicyandiamide | 42 (amino group equivalent) | — | | | 4.4 | |
| (C) | 2MZ-H | | | | | 0.4 | 0.8 |
| | EPICURE P101 | | | 2.5 | 5 | | |
| | TH-1000 | | | | | | |
| Others | TIPAQUE CR-50 | | | 15 | 15 | 15 | 15 |
| | AEROSIL R972 | | | 1 | 1 | 1 | 1 |
| Epoxy equivalent:Phenolic hydroxyl equivalent | | | | 1:1 | 1:1 | 1:1 | 1:1 |
| Gel time (s) | | | | 28 | 8 | 15 | 25 |
| Appearance | | | | ○ | x | ○ | ○ |
| Edge coverage (%) | | | | 0 | 45 | 0 | 0 |

TABLE 2B-continued

| | | | | |
|---|---|---|---|---|
| Electrical insulation property (kV/mm) | 100 | 40 | 100 | 100 |
| Breakdown voltage (kV/100 μm) | 10 | 4 | 10 | 10 |
| Breakdown voltage (kV/50 μm) | 5 | 0 | 3 | 5 |
| Flexibility (cm) | 50< | 50< | 10 | 30 |
| Baking temperature/time | 180° C./20 minutes | 180° C./20 minutes | 180° C./20 minutes | 180° C./20 minutes |

| Component | | | | Comparative Example 13 | Comparative Example 14 | Comparative Example 15 | Comparative Example 16 |
|---|---|---|---|---|---|---|---|
| | | Epoxy equivalent (g/eq) | Softening point (° C.) | | | | |
| (A) | Epototo YD-012 | 655 | 81 | | 65 | 78 | |
| | jER1055 | 850 | 93 | | | | |
| | jER1004 | 925 | 97 | | | | |
| | Epototo YD-904 | 950 | 105 | | | | 100 |
| | Epototo YD-907 | 1500 | 126 | | 35 | | |
| | jER1007 | 1975 | 128 | 100 | | 22 | |
| | | Phenolic hydroxyl equivalent (g/eq) | Softening point (° C.) | | | | |
| (B) | jER Cure 170 | 340 | 90 | 17.3 | 36 | 36 | 36 |
| | jER Cure 171N | 225 | 80 | | | | |
| | Epototo ZX-798P | 710 | 115 | | | | |
| | Dicyandiamide | 42 (amino group equivalent) | — | | | | |
| (C) | 2MZ-H | | | 0.6 | 0.4 | 0.4 | 0.6 |
| | EPICURE P101 | | | | | | |
| | TH-1000 | | | | | | |
| Others | TIPAQUE CR-50 | | | 15 | 15 | 15 | 15 |
| | AEROSIL R972 | | | 1 | 1 | 1 | 1 |
| Epoxy equivalent:Phenolic hydroxyl equivalent | | | | 1:1 | 1:1 | 1:1 | 1:1 |
| Gel time (s) | | | | 12 | 25 | 28 | 9 |
| Appearance | | | | x | ○ | ○ | x |
| Edge coverage (%) | | | | 30 | 0 | 0 | 15 |
| Electrical insulation property (kV/mm) | | | | 10 | 60 | 80 | 30 |
| Breakdown voltage (kV/100 μm) | | | | 1 | 6 | 8 | 3 |
| Breakdown voltage (kV/50 μm) | | | | 0 | 2 | 4 | 0 |
| Flexibility (cm) | | | | 50 | 50 | 50 | 50 |
| Baking temperature/time | | | | 180° C./20 minutes | 180° C./20 minutes | 180° C./20 minutes | 120° C./40 minutes |

As shown above, the powder coating composition of the present invention can form a coating film being smooth and superior in edge cover property and also being superior in insulation property.

In addition, by a method for forming a coating film using a coating composition according to the present invention, heating can be performed at a temperature relatively low as a powder coating composition.

In addition, when the coating composition of the present invention is applied to an object having a complicated shape, for example, a coil, a motor core, or a bus bar to form a coating film, a coating film can be satisfactorily formed even at detailed parts, and a coating film can be formed which is smooth and superior in edge cover property and also is superior in insulation property.

Furthermore, the powder coating composition of the present invention can exhibit superior electrical insulation property even with various film thicknesses, for example, in the form of a thin film about 30 μm thick. Therefore, the powder coating composition of the present invention is also useful as a powder coating composition for insulation.

On the other hand, in Comparative Examples 1 to 3, the epoxy equivalent, softening point and gel time with the bisphenol A type epoxy resin (A) are outside the scope of the present invention. As a result, it can be seen that the coating films are significantly inferior in edge cover property, coating film appearance, such as smoothness, and insulation property to the coating films formed from the coating compositions of the present invention.

In Comparative Examples 4 to 10, for example, the gel time is outside the scope of the present invention. As a result, the coating films failed to have superior smoothness and a high edge cover property in a balanced manner.

In addition, even if the edge cover property is relatively high, the insulation property is clearly inferior.

In Comparative Example 11, dicyandiamide (manufactured by Nippon Carbide Industries Co., Inc.; amine curing agent, amino equivalent: 42 g/eq) was blended and used with epoxy equivalent: amino equivalent=1:1 instead of the phenolic curing agent (B). As a result, the resulting coating composition merely formed a coating film being inferior in edge cover property and being low in flexibility.

In Comparative Examples 12 and 13, the epoxy equivalent and the softening point of the bisphenol A type epoxy resin (A) are outside the scope of the present invention. As a result of adjusting the gel time within the range of the present invention, when the epoxy equivalent was smaller than 800 g/eq and the softening point was lower than 90° C. (outside the scope of the present invention) as compared to the coating composition of the present invention, the edge coverage (edge cover property) decreases, whereas when the epoxy equivalent was larger than 1,150 g/eq and the softening point was higher than 115° C. (outside the scope of the present invention), the coating film appearance was poor, and the edge coverage (edge cover property) and the electrical insulation property could not be balanced. That is, when a coating film is formed from the coating compositions according to these comparative examples, problems such as coating film cracking and a poor insulation property will occur in components and the like having edges.

Comparative Examples 14 and 15 are comparative examples relating to coating compositions in which the bisphenol A type epoxy resin (A) is outside the scope of the present invention. It is shown that even if a plurality of bisphenol A type epoxy resins (A) are contained in combination, the edge cover property is remarkably inferior. Therefore, when a coating film is formed from the coating compositions according to these comparative examples, problems such as coating film cracking will occur in components and the like having edges.

In Comparative Example 16, the gel time is outside the scope of the present invention. As a result, cure occurred even at low temperatures, but the smoothness was remarkably inferior and the electrical insulation property was insufficient.

INDUSTRIAL APPLICABILITY

The powder coating composition of the present invention forms a smooth coating film being superior in edge cover property, and superior in insulation property.

In addition, by a method for forming a coating film using the coating composition according to the present invention, heating can be performed at low temperatures, and it is possible to form a coating film being smooth and superior in edge cover property and also possible to form a coating film superior in insulation property.

The invention claimed is:

1. A powder coating composition comprising a bisphenol A type epoxy resin (A), a phenolic curing agent (B), and a curing accelerator (C) as coating film forming components, wherein
the bisphenol A type epoxy resin (A) has
an epoxy equivalent of 800 g/eq or more and 1,150 g/eq or less, and
a softening point of 90° C. or higher and 115° C. or lower,
an amount of the bisphenol A type epoxy resin (A) is 55 parts by mass or more and 85 parts by mass or less per 100 parts by mass of the resin solid content of the powder coating composition,
the phenolic curing agent (B) has
a phenolic hydroxyl equivalent of 200 g/eq or more and 750 g/eq or less,
the curing accelerator (C) comprises an amine adduct between an amine compound and a bisphenol A type epoxy resin,
an amount of the curing accelerator (C) is 1.5 parts by mass or more and 5.0 parts by mass or less per 100 parts by mass of the bisphenol A type epoxy resin (A), and
the powder coating composition has a gel time at 200° C. of 10 seconds or more and 25 seconds or less.

2. The powder coating composition according to claim 1, wherein the gel time at 200° C. is 15 seconds or more and 25 seconds or less.

3. The powder coating composition according to claim 1, wherein a ratio of the epoxy equivalent of the bisphenol A type epoxy resin (A) to the phenolic hydroxyl equivalent of the phenolic curing agent (B) is 1:0.5 to 1:1.5.

4. The powder coating composition according to claim 1, wherein a cured coating film of the powder coating composition has a dielectric breakdown strength of 50 kV/mm or more and 200 kV/mm or less.

5. The powder coating composition according to claim 1, wherein the powder coating composition is a powder coating composition for insulation.

6. An electric transmission component having a cured film of the powder coating composition according to claim 1 on an object to be coated.

7. A method for forming a coating film, in which a cured film is formed by applying the powder coating composition according to claim 1 to an object to be coated and heating it, wherein
the heating is performed at a temperature of the object to be coated of 120° C. or higher and 250° C. or lower.

* * * * *